United States Patent Office 3,445,575
Patented May 20, 1969

3,445,575
CONTROL OF ACARIDS WITH TRIPHENYL
TIN COMPOUNDS
James L. Taylor, Gainesville, Fla., assignor to Thompson-Hayward Chemical Company, Kansas City, Kans., a corporation of Delaware
No Drawing. Filed July 24, 1967, Ser. No. 655,274
The portion of the term of the patent subsequent to Aug. 23, 1983, has been disclaimed
Int. Cl. A01m 9/24
U.S. Cl. 424—288                    4 Claims

ABSTRACT OF THE DISCLOSURE

This invention relates to a method of controlling pestiferous organisms of the order Arachnida, family Tetranychidae, comprising contacting said organisms with an effective amount of a compound of the formula;

wherein each R may be phenyl, halophenyl or alkoxyphenyl; and X may be hydroxy, acyloxy or halogen.

---

This invention relates to a novel method of controlling pestiferous organisms. More particularly, this invention relates to and has as its object a novel method of controlling certain pestiferous acarids, and to novel compositions for obtaining this object.

It has been discovered that acarids, and particularly those acarids of the order Arachnida, family Tetranychidae, may be effectively controlled by the practice of this invention. It has been discovered that these pestiferous acarids may be effectively controlled by being contacted with an effective amount of a compound of the Formula I:

wherein each R may be the same or different and is selected from the group consisting of phenyl, halophenyl (e.g. chlorophenyl) and alkoxy phenyl (e.g. methoxy phenyl); and X is selected from the group consisting of hydroxy, halogen (e.g. chlorine or bromine) and acyloxy, wherein the acyl group is of a hydrocarbon carboxylic acid of less than twelve carbon atoms. Most preferably, very satisfactory results have been obtained wherein each R is phenyl and X is selected from the group consisting of hydroxy, chloro and acetoxy, although the other compounds also yield acceptable results.

The preferred acyloxy radicals are those of hydrocarbon carboxylic acids of less than twelve carbon atoms, as exemplified by the lower alkanoic acids (e.g. acetic, propionic, butyric and tert. pentanoic acids); the lower alkenoic acids; the monocyclic aryl carboxylic acids (e.g. benzoic and toluic acids); the monoalicyclic aryl lower alkanoic acids (e.g. phenacetic and β-phenylpropionic acids); the cycloalkane carboxylic acids and the cycloalkene carboxylic acids. Most preferred are the acyloxy radicals derived from the alkanoic acids, for example, acetic acid and propionic acid.

Among the compounds which may be employed in the practice of this invention may be included such compounds as triphenyltin hydroxide; triphenyltin halides, for example, triphenyltin chloride, triphenyltin bromide; triphenyltin acylates, for example, triphenyltin acetate, triphenyltin butyrate, triphenyltin benzoate, triphenyltin phthalate, trichlorophenyltin hydroxide, and other like triphenyltin compounds.

In the practice of this invention, very satisfactory results have been obtained where compositions of this invention comprise a small but effective amount of the principal active ingredient of this invention, i.e. the compounds of Formula I), effectively dispersed in a substantial amount of a suitable extending agent. In this disclosure and in the claims appended thereto, the term "dispersed" is used in its widest possible sense. When it is said that the compounds of this invention are dispersed, it means that the particles may be molecular in size and held in true solution in a suitable solvent. It means further, that the particle may be colloidal in size and dispersed through a liquid phase in the form of suspensions or emulsions or in the form of particles held in suspension by wetting agents. It also includes particles which are dispersed in a semi-solid viscous carrier, such as petrolatum or soap, in which they may be actually dissolved in the carrier or held in suspension in the carrier with the aid of suitable emulsifying or wetting agents. The term "dispersed" also means that the particles may be mixed with and spread throughout a solid carrier so that the mixture is in the form of powder or dust. The term "dispersed" also includes mixtures which are suitable for use as aerosols, including solutions, suspensions or emulsions of the agents of this invention in a carrier, such as xylene or water, with a propellant such as Freon which boils below room temperature at ordinary pressure.

The term "extending agent" as used in this disclosure and in the appended claims, includes any and all of those agents in which the compounds of the instant invention are dispersed. It includes, therefore, the solvents of a true solution, the liquid phase of suspensions, emulsions or aerosols, the semi-solid carrier of ointments and the solid phase of dust and powders.

It has been found that the compounds of this invention are active when dispersed in an extending agent at concentrations of 0.001% by weight or even lower. This concentration is effective when the dispersing agent is a liquid, but it is preferred to use more concentrated mixtures when the dispersing agent is a semi-solid or a solid. This is because liquid dispersions which are, of course, suitable for use as sprays give a more intimate contact with the pests than the solid dispersions and, therefore, lower concentrations are more effective with liquid dispersions.

There are a number of solvents which can be utilized for the preparation of solutions, suspensions or emulsions of the compounds of this invention. High boiling oils of vegetable origin such as castor oil, or olive oil, have been found to be suitable. Low boiling, more volatile solvents such as acetone, alcohols (such as methanol and ethanol), benzene, toluene and the like are also useful. Xylene and heavy aromatic naphtha are particularly desirable as solvents. For certain applications it may be advantageous to resort to mixtures of solvents.

If the active agents are to be applied as aerosols, it is convenient to dissolve them in a suitable solvent and to disperse the resulting solution in a liquid such as Freon, which boils below room temperature. For such applications it is better to employ true solutions of the active agent; although, it is possible to employ suspensions or emulsions of the active agent.

The agents of this invention are often dispersed either in the form of emulsions or suspensions, in an inert carrier with the aid of a surface-active substance. Such surface-active substances may be anion-active, cation-active or non-ionizing. There may be mentioned by way of example, natural or synthetic soaps, Turkey-red oil, calcium alkylaryl sulfonates, fatty alcohol sulfonates, esters of fatty acids and the like. Other examples include higher molecular weight quaternary ammonium compounds, as well as condensation products of ethylene and propylene oxide with monohydric and polyhydric alcohols.

For use as a powder or dust the active ingredients of this invention may be mixed with any of a number of extending agents either organic or inorganic in nature which are suitable for the manufacture of pulverulent preparations. In addition to mixing the ingredients directly the active compounds of this invention may first be dissolved in a suitable solvent and the dry extending agents may be treated with the resulting solution so that after the solvent evaporates off the active ingredients is effectively coated on the surface of the extending agent. The extending agents which may be employed include, for example, tricalcium phosphate, calcium carbonate, attapulgite, kaolin, bole, kieselguhr, montmoreillanite, talc, calcined magnesia, boric acid and others. Materials of vegetable origin such as powdered cork, powdered wood and powdered walnut shells are also useful. These mixtures may be used in the dry form or, by the addition of wetting agents, the dry powder can be rendered wettable by water so as to obtain stable aqueous dispersions suitable for use as sprays.

It has been found that most satisfactory results are obtained in the practice of this invention, when the active ingredient of the invention is present in the compositions of this invention an amount of from 1.0% to about 95.0% by weight of the final composition, and optimally, in an amount of from 20.0% to about 50.0% by weight of the final composition employed. It has also been found that satisfactory results are obtained when the pestiferous organisms of the order Arachnida, family Tetranychidae sought to be controlled by the practice of the instant invention are contacted with compositions containing the compounds of Formula I, in a concentration of from about 50 to about 1000 p.p.m. and preferably about 100 to 300 p.p.m.

The final compositions may be employed and applied against the pestiferous acarids sought to be controlled, in any manner known to the art. Thus, they may be employed directly on the acarids sought to be controlled, thereby guaranteeing that direct contact with the pestiferous organism controlled by the practice of this invention is made.

Among the pestiferous insects which may be controlled by the practice of this invention, may be included those acarids of the order Arachnida, family Tetranychidae, and most particularly such acarids as *Eotetranychus hickoriae*. For some reason, not understood at the present time, the compounds of this invention are very selective in their action and have been found to provide control of only specific pestiferous organisms while having no effect on other closely related acarids. More particularly, it has been found that while the compounds of the instant invention are effective in controlling such acarids as *Eotetranychus hickoriae*, they have been found to be ineffective in the control of such other closely related spider mites of the order Arachnida, family Tetranychidae as *Tetranychus Urticae*. The reason for this unexpected activity is not presently understood.

In addition to the foregoing, it should be noted that organotin substances are known to be comparatively phytotoxic. Therefore, if desired, in the practice of this invention, this phytotoxicity may be reduced by the addition of certain of other additives to the compositions of this invention prior to their application to the acarids sought to be controlled hereunder. Such additives as those disclosed and described in U.S. Patent 3,140,977, may be employed for such purposes.

The invention may be further illustrated according to the following examples.

EXAMPLE 1

To 740 parts of technical triphenyltin hydroxide contained in a dry blender are added 30 parts of sodium lignin sulfonate, 45 parts sulfonated aliphatic polyester and 675 parts kaolinite. After premixing, the mixture is ground in a hammer mill to a fineness of 98% minimum passing a 325 mesh screen. The resulting product is a water dispersible powder containing 50% active ingredient. The 50% wettable power is dispersed and suspended in water to prepare a ready-to-use spray of the desired active ingredient content just prior to application to the acarids sought to be treated.

EXAMPLE 2

A dust containing 3% by weight of the active ingredient is prepared by blending 120 parts of 50% wettable powder as described in Example 1 and 1880 parts of soapstone talc in a ribbon mixer. The dust is applied directly to the acarids sought to be treated.

EXAMPLE 3

A flowable formulation containing 2 lbs. per gallon of active ingredient is prepared by milling to an average particle diameter of 1–3 microns by conventional method, such as ball milling or sand milling, 215 lbs. of technical triphenyltin acetate, 200 lbs. of 5% aqueous dispersion of refined isomorphous clay, 30 lbs. of alkyl aryl polyether alcohol, 10 lbs. of polyethylene glycol fatty esters, 35 bs. of potato starch, 47 lbs. of sodium carbonate, and 463 lbs. of water.

The resulting liquid formulation is diluted with water to prepare a ready-to-use spray of the desired active ingredient content just before application to the acarids.

Similarly, following the procedure set forth in Example 3, but substituting an equivalent amount of triphenyltin chloride for the triphenyltin acetate, like results are obtained.

EXAMPLE 4

Compositions containing 0.4 pound and 0.8 pound respectively of the 50% water dispersible powder of triphenyltin hydroxide, as described in Example 1, in 100 gallons of water were prepared. In three separate applications, at two week intervals the solutions were applied to leaves having *Eotetranychus hickoriae* infestation. Six weeks after the initial application counts of the organisms were made and the results are reported in Table 1 below:

TABLE 1

| Test compound | Concentration (lb.) | Average No. of *Eotetranychus hickoriae* per sq. inch |
|---|---|---|
| Triphenyltin hydroxide | 0.4 | 3.6 |
| Do | 0.8 | 3.8 |
| Control (untreated) | | 62.0 |

EXAMPLE 5

A wettable powder containing 20% triphenyltin hydroxide is prepared in accordance with the procedure set forth in Example 1. Liquid sprayable suspension was prepared by dissolving 3, 5 and 7 grams respectively of the 20% wettable powder in one liter of water and the resultant compositions were charged into hand sprayers. Young apple trees, infested with *Tetranychus urticae* were sprayed twice with the compositions and counts were made of the average leaf population of the acarids and eggs at weekly intervals. The results are reported in Table 2 below:

TABLE 2

| Test material | Concentration (g./l.) | Before treatment | | 1 week after | | 2 weeks after | |
|---|---|---|---|---|---|---|---|
| | | Mites | Eggs | Mites | Eggs | Mites | Eggs |
| Triphenyltin hydroxide | 3 | 322 | 414 | 531 | 676 | 157 | 242 |
| Do | 5 | 133 | 140 | 371 | 514 | 625 | 554 |
| Do | 7 | 29 | 32 | 247 | 526 | 273 | 435 |
| Control (untreated) | | 29 | 94 | 54 | 174 | 251 | 288 |

EXAMPLE 6

The procedure set forth in Example 1 is followed except that an equivalent amount of triphenyltin acetate is substituted for the triphenyltin hydroxide to yield a 50% wettable powder of triphenyltin acetate. This powder is then admixed at the rate of one pound and three pounds respectively, with 100 gallons of water to provide a sprayable composition. These compositions were then sprayed on test plots in three separate applications. The test plots were checked at random with hand lenses without disclosing the presence of *Eotetranychus hickoriae* while the control plots disclosed the presence of the acarid.

Similarly, following the procedure of Example 6 but substituting equivalent amounts of triphenyltin chloride for the triphenyltin acetate, like results were obtained although some phytotoxicity was noted.

What is claimed is:

1. A method of controlling pestiferous organisms which comprises contacting the acarid *Eotetranychus hickoriae* with an effective amount of a compound of the formula;

wherein each R is selected from the group consisting of phenyl, halophenyl and alkoxyphenyl; an X is selected from the group consisting of hydroxy, acyloxy and halogen.

2. The method of claim 1, wherein the compound is triphenyltin hydroxide.

3. The method of claim 1, wherein the compound is triphenyltin acetate.

4. The method of claim 1, wherein each R is phenyl and X is selected from the group consisting of hydroxy, acetoxy and chloro.

References Cited

UNITED STATES PATENTS 3,268,395  8/1966  Taylor.

ALBERT T. MEYERS, *Primary Examiner.*

S. FRIEDMAN, *Assistant Examiner.*